United States Patent
ZaBan et al.

(10) Patent No.: US 7,790,067 B2
(45) Date of Patent: Sep. 7, 2010

(54) METHOD FOR PRODUCTION OF NANOPOROUS ELECTRODES FOR PHOTOELECTROCHEMICAL APPLICATIONS

(75) Inventors: Arie ZaBan, Shoham (IL); Larissa Grinis, Rishon Lezion (IL); Asher Ofir, Moshav Nehalim (IL)

(73) Assignee: 3GSolar Ltd., Jerusalem (IL)

( * ) Notice: Subject to any disclaimer, the term of this patent is extended or adjusted under 35 U.S.C. 154(b) by 0 days.

(21) Appl. No.: 11/997,772

(22) PCT Filed: Aug. 3, 2006

(86) PCT No.: PCT/IL2006/000900
§ 371 (c)(1),
(2), (4) Date: Jul. 21, 2008

(87) PCT Pub. No.: WO2007/015250
PCT Pub. Date: Feb. 8, 2007

(65) Prior Publication Data
US 2009/0114275 A1    May 7, 2009

Related U.S. Application Data

(60) Provisional application No. 60/705,188, filed on Aug. 4, 2005.

(51) Int. Cl.
*H01B 1/08* (2006.01)
*H01M 6/00* (2006.01)
*H01L 31/00* (2006.01)

(52) U.S. Cl. .............. 252/520.2; 252/520.1; 252/519.3; 252/518.1; 252/519.5; 429/122; 136/258; 136/243

(58) Field of Classification Search .............. 252/520.2, 252/520.1, 519.3, 518.1, 519.5; 429/122; 136/258, 243
See application file for complete search history.

(56) References Cited

U.S. PATENT DOCUMENTS

| | | | |
|---|---|---|---|
| 6,258,237 B1 * | 7/2001 | Gal-Or et al. | 204/548 |
| 6,410,086 B1 * | 6/2002 | Brandon et al. | 427/248.1 |
| 6,533,966 B1 * | 3/2003 | Nonninger et al. | 252/520.1 |
| 6,870,266 B2 | 3/2005 | Nakamura et al. | |
| 7,147,805 B2 * | 12/2006 | Miyoshi | 252/520.1 |
| 7,169,327 B2 * | 1/2007 | Ito et al. | 252/500 |
| 7,662,316 B2 * | 2/2010 | Zaban et al. | 252/519.3 |
| 2004/0061109 A1 * | 4/2004 | Nakamura et al. | 257/43 |
| 2006/0070651 A1 * | 4/2006 | Kang et al. | 136/256 |
| 2006/0073667 A1 * | 4/2006 | Li et al. | 438/311 |
| 2008/0224104 A1 * | 9/2008 | Zaban et al. | 252/519.5 |
| 2009/0050856 A1 * | 2/2009 | Kosowsky et al. | 252/502 |
| 2009/0084434 A1 * | 4/2009 | Park et al. | 136/252 |
| 2009/0152115 A1 * | 6/2009 | Zaban et al. | 204/456 |

OTHER PUBLICATIONS

Kamada et al., "Fabrication of metal oxide-diamond composite films by electrophoretic deposition and anodic dissolution", J. Mater. Res., 18 (12) (Dec. 2003), 2826-2831.*

Kirk-Othmer, Encyclopedia of Chemical Technology, 4th ed., John Wiley & Sons, Inc., 1997, vol. 23, pp. 478-480.*

* cited by examiner

*Primary Examiner*—Douglas M C Ginty
(74) *Attorney, Agent, or Firm*—Browdy and Neimark, PLLC

(57) ABSTRACT

The invention relates to a two-step method for production of low temperature mechanically stable and electrically efficient nanoporous electrodes, in particular titania nanoporous electrodes, for photoelectrochemical applications. The method of the invention comprises electrophoretic deposition (EPD) of nanosize titania crystals from a stable suspension containing thereof on a conductive substrate, and formation of mechanical and electrical contact between them. The invention further relates to nanoporous electrodes obtained by this method and to dye sensitized solar cells (DSSCs) fabricated therefrom.

20 Claims, No Drawings

METHOD FOR PRODUCTION OF NANOPOROUS ELECTRODES FOR PHOTOELECTROCHEMICAL APPLICATIONS

FIELD OF THE INVENTION

The present invention relates to a method for production of nanoporous electrodes for photoelectrochemical applications and, in particular, to $TiO_2$ nanoporous electrodes and dye sensitized solar cells fabricated therefrom.

BACKGROUND OF THE INVENTION

Direct conversion of sunlight into electric power by solar cells is one of the only clean energy resources. In solar cells electricity is produced without the exhaust of greenhouse gases and without the leftover of nuclear waste. Dye-sensitized solar cells (DSSC) appear to have significant potential as low cost alternatives to conventional p-n junction solar cells. Being transparent to most of the visible range of wavelengths makes the DSSC one of the only candidates for power windows that will further decrease the cost of this clean energy.

DSSCs consist of a nanocrystalline, mesoporous network of a wide bandgap semiconductor, which is covered with a monolayer of dye molecules. The semiconductor is deposited onto a transparent conductive oxide electrode, through which the cell is illuminated. The $TiO_2$ pores are filled with a redox mediator, which acts as conductor, connected to a counter electrode. Upon illumination, electrons are injected from the photo-excited dye into the semiconductor and move towards the transparent conductive substrate, while the electrolyte reduces the oxidized dye and transports the positive charges to the counter electrode. Such systems can reach solar to electric conversion efficiencies of about 12% but are still not produced on a large scale.

Lowering the cost of solar cell production is one of the most important aims in photovoltaics. Since the report of O'Regan and Gratzel (1991), DSSCs have been developed very quickly as one of the most promising devices for solar energy conversion. Nanocrystalline titanium dioxide porous film is the essential part of DSSC. The conventional method of preparation of porous nanocrystalline $TiO_2$ electrodes is based on viscous $TiO_2$ paste with organic additives that can be deposited on a substrate by screen-printing or blade coating. Organic additives enable the preparation of crack-free thick films (10-18 μm) in one deposition. Thermal treatment at 450-550° C. is used to remove organics and sinter the nanoparticles together to establish mechanical stability and electrical connection in the network.

Low temperature preparation of nanocrystalline titania ($TiO_2$) films is necessary for the fabrication of light weight, flexible, thin and low cost DSSCs on plastic substrates. Various methods have been employed to prepare titania mesoporous films at temperatures below 150° C. These temperatures permit the use of plastic substrates such as polyethylene terephthalate (PET). Among the reported methods, the most efficient ones are hydrothermal crystallization (Oekermann et al., 2004; Zhang et al., 2003), mechanical pressing technique (Lindström et al., 2002; Boschloo et al., 2002; Lindström et al., 2001a; Lindström et al, 2001b) and electrophoretic deposition (EPD) assisted by chemical vapor deposition (CVD) and UV treatment (Miyasaka et al., 2002; Murakami et al., 2003). However, cell efficiencies are still low in comparison with the best cells prepared on the basis of sintered films at 450-550° C. (10.4%) (Nazeeruddin et al., 1993; Nazeeruddin et al., 2001).

Electrophoretic deposition (EPD) is a useful way for the preparation of thick binder-free particulate films on conductive substrates in much shorter time compared to the other coating techniques. EPD is especially attractive because of the low cost, simple setup, formation of uniform layers of controlled thickness and homogeneous microstructure (Sarkar and Nicholson, 1996; Zhitomirsky, 2002; Boccaccini and Zhitomirsky, 2002). So far, studies on EPD of $TiO_2$ nanoporous films for DSSCs are very sparse.

Miyasaka et al (2002) and Murakami et al (2003) reported the EPD of the commercially available $TiO_2$ nanoparticle powders, P-25 and F-5, from dry mixed solvent of tert-butanol and acetonitrile. Direct current (DC) electric field of 200 V/cm was applied for 0.5 to 1 min. As a result, $TiO_2$ nanoporous films with thickness of 7-13 μm were prepared and after drying at 90° C. used for fabrication of DSSCs. These DSSCs yielded solar-to-electric conversion efficiency of 2.0% when illuminated by 100 mW/cm² white light. It is worth noting that conductive glass was used as electrode substrate in this case. After post-treatment of the electrodeposited film by chemical vapor deposition (CVD) of $Ti(OC_3H_7)_4$, followed by exposure to UV-light, conversion efficiency became 3.7%. After post-treatment by microwave irradiation, the conversion efficiency reached 4.1%. With respect to commercial production, the process used by Miyasaka et al and Murakami et al suffers from several shortcomings. First, cell efficiencies are still low, even with post-treatments. Second, acetonitrile is a highly toxic and carcinogenic chemical, and cannot be used without special precautions. Finally, the post-treatment processes, CVD and UV, are too expensive to scale up.

Much lower light to electricity conversion efficiencies have been reported by other authors for DSSCs prepared by EPD (Matthews et al., 1994; Fujimura and Yoshikado, 2003). Fujimura and Yoshikado (2003) used ion-free water without binder as solvent for EPD, which has the advantages of low cost, industrial safety, environmental protection and the minimization of contamination in produced layers. However, the main problem associated with the applying of water-based suspensions for EPD is the formation of gas by the hydrolysis of water above a DC voltage of about 1.4 V, resulting in large pinholes in deposited layers, lack of film uniformity and adherence (Zhitomirsky, 2002; Tabellion and Clasen, 2004). Fujimura and Yoshikado (2003) worked at DC voltages higher than 1.5 V, with relatively low deposition rates, e.g., a 15 μm thick film required a deposition duration of 530 sec (about 9 min). The DSSCs fabricated from these electrodes showed low open circuit voltage (Voc) (maximum value 480 mV) and low short circuit current density (Jsc) (maximum value 0.4 mA/cm²). No information on the fill factor (FF) and efficiency of these cells was provided.

SUMMARY OF THE INVENTION

The present invention relates to a method for production of a nanoporous electrode for photoelectrochemical applications, comprising:
(a) deposition of nanosize $TiO_2$ crystals on a conductive substrate; and
(b) formation of mechanical and electrical contact between the $TiO_2$ crystals to form a mechanically stable and electrically efficient nanoporous electrode, wherein the deposition of nanosize $TiO_2$ crystals in step (a) is carried out by electrophoretic deposition (EPD) from a stable suspension of $TiO_2$ crystals obtained by: (i) treatment of $TiO_2$ crystals with a non-ionic surfactant in a polar organic solvent, under conditions that break aggregated particles into separate ones and enhance surfactant adsorption on the crystals surface; and (ii) addition of the suspension obtained in step (i) to a charging solution consisting of iodine, acetone and deionized water in a polar organic solvent, under mixing, followed by sonication of the suspension.

DETAILED DESCRIPTION OF THE INVENTION

The present invention relates to a two-step method for production of low temperature mechanically stable and electrically efficient nanoporous electrodes for photoelectrochemical applications.

The first step of the present invention is performed using a stable suspension of $TiO_2$ nanoparticles, prepared by treatment of uncharged $TiO_2$ nanoparticles with a non-ionic surfactant in a polar organic solvent, followed by addition of the suspension obtained to a charging solution consisting of iodine, acetone and deionized water in a polar organic solvent, under mixing, followed by sonication of the suspension. The treatment of the uncharged $TiO_2$ nanoparticles with the non-ionic surfactant in a polar organic solvent is carried out under conditions that break aggregated particles into separate ones and enhance surfactant adsorption on the nanoparticle surface, such as stirring, milling and/or ultrasound sonication conditions. Ultrasound sonication is carried out with cooling of the mixed suspension in order to maintain a maximum of room temperature. The duration of treatment of the $TiO_2$ nanoparticles with the non-ionic surfactant in the polar organic solvent should be long enough to allow specific adsorption of the non-ionic surfactant on the surface of the nanoparticles. This process is disclosed in the International Patent Application No. PCT/IL2006/000898, entitled "Method for preparation of stable metal oxide nanoparticles suspensions", filed on the same date by same applicant, and herewith incorporated by reference in its entirety as if fully described herein. The International Patent Application entered the National Stage as U.S. application Ser. No. 11/997,757, with a 371 (c)(1), (2), (4) date of Feb. 4, 2008, and was issued as U.S. Pat. No. 7,662,316 on Feb. 16, 2010.

The polar organic solvent used according to the method of the present invention may be, without being limited to, any straight or branched $C_1$-$C_6$ alkanol such as methanol, ethanol, propanol, isopropanol, butanol, isobutanol, sec-butanol, tert-butanol, pentanol, neopentanol, sec-pentanol, hexanol and mixtures thereof, and is preferably ethanol. The selection of the non-ionic surfactant is based on the affinity and the adsorption of the surfactant to the $TiO_2$ surface in order to prepare (modify) the surface of the $TiO_2$ nanoparticles for the charging step, i.e. to change the surface of the $TiO_2$ nanoparticles properties, apparently, in order to facilitate the adsorption of protons on the particles surface and/or to create a steric repulsion.

It should be noted that the surfactant should be selected such that it does not noticeably increase the ionic strength of the suspension, because increase of the ionic strength of the suspension results in reduced thickness of the electrical double layer of particles, and in particle coagulation and sedimentation. The preferred non-ionic surfactants are acetylacetone, ethyleneglycol or similar compounds. The concentration of the non-ionic surfactant in the polar organic solvent should be preferably minimized, and in the case of acetylacetone it may be in the range of 0.2-3 ml/l, preferably 0.5-2.5 ml/l, most preferably 0.8-1.8 ml/l.

It is worth noting that, in some cases, this treatment alone is not enough to obtain stable $TiO_2$ nanoparticles suspensions. In such cases, it is useful to clean initially the surface of the particles from organic and, sometimes, inorganic impurities. This is typically achieved by thermal treatment or a treatment with an inorganic acid and/or a non-ionic surfactant, followed by washing with deionized water and thermal treatment. The inorganic acid which can be used for the initial treating of the $TiO_2$ nanoparticles may be, without being limited to, nitric acid or hydrochloric acid, and the non-ionic surfactant that may serve for the same purpose may be, without being limited to, acetylacetone or ethyleneglycol.

The uncharged $TiO_2$ nanoparticles suspension obtained in step (i) is treated with a charging solution consisting of iodine, acetone and deionized water in a polar organic solvent. It should be understood that the polar organic solvent used in the charging solution of step (ii) may be identical to or different from the polar organic solvent used for suspending the uncharged $TiO_2$ nanoparticles according to step (i).

The concentration of iodine in the charging solution is in the range of 0.02-0.3 g/l, preferably 0.06-0.25 g/l, most preferably 0.08-0.2 g/l suspension; the concentration of acetone is in the range of 1-500 ml/l, preferably 5-250 ml/l, most preferably 10-100 ml/l suspension; and the concentration of deionized water is in the range of 1-10 ml/l, preferably 4-8 ml/l, most preferably 5-6 ml/l suspension.

The uncharged $TiO_2$ nanoparticles required for the preparation of the stable suspension according to the present invention are commercially available low cost $TiO_2$ nanopowders, e.g., P-25, P-90 (Degussa AG, Germany) or nanoparticles from other sources. The concentration of the $TiO_2$ nanoparticles in the suspension should be relatively low, because in dilute colloidal suspensions interparticle forces keep the particles well dispersed, and under an applied electric field the particles are moving and depositing individually. Thus, the concentration of the $TiO_2$ nanoparticles is in the range of 1-50 g/l, preferably 1.2-30 g/l, most preferably 1.5-15 g/l.

The EPD is carried out preferably at constant current mode with current density of 0.1-5 $mA/cm^2$, at room temperature. Other temperatures of the electrophoretic bath (typically cooling) are used for optimization of the product to the specific application. Transparent conductive substrate designed for photoelectrode for use in photoelectrochemical applications, such as F-doped-$SnO_2$ conductive glass or conductive plastic, are used as the cathode on which the deposition of the $TiO_2$ nanoparticles takes place. The anode may consist of conductive oxide coated glass or plastic, high purity titanium, graphite and other conductive materials that are stable in these conditions.

The resulting deposits consist of particles that are tightly and uniformly packed, distributed homogeneously, forming the homogeneous porous structure preferable for the dye sensitized solar cell (DSSC) electrolyte transport. It is preferable not to use a strong stirring between electrodes of EPD bath because this can induce aggregation of nanoparticles and deterioration of deposited layer quality. The duration of the EPD depends on the desired thickness of the nanoporous layer, the current density and the suspension composition, as shown in the Examples below.

The electrophoretically deposited $TiO_2$ film obtained may be further dried. The drying process according to the present invention is carried out preferably at 80-150° C. during 5-60 min.

The step (b) of the present invention should involve one of the following three processes with an option to combine more than one process for improvement of the electrode performance. The three processes are (1) mechanical pressing of the electrophoretically deposited nanoporous $TiO_2$ film after drying; (2) coating the electrophoretically deposited nanoporous TiO$_2$ film with a thin layer of metal oxide polymeric species by sol-gel EPD; and (3) sintering at 450-600° C. for 5-120 min.

The mechanical pressing technique developed by Lindström et al (Lindström et al., 2002; Boschloo et al., 2002; Lindström et al., 2001; Lindström et al., 2001) to prepare nanoporous TiO$_2$ films under high pressure is a useful low-temperature method for DSSCs fabrication. Using this method, efficiencies of up to 3.0% on conductive glass and 2.3% on conductive plastic substrate were reported for a light intensity of 100 mW/cm$^2$. For a spreading of TiO$_2$ (P-25 Degussa) suspension onto conductive substrates these authors have used the blade-coating method. Lindström et al performed pressing of dry P-25 layers using 30 μm polyethene foil (Lindström et al., 2001) or 50 μm aluminium foil (Lindström et al., 2002) as separating films and also without any separating films (Boschloo et al., 2002; Lindström et al., 2001). The limitation of Lindström et al method is due to the fact that some TiO$_2$ nanopowder is always left on the separating films or on the upper steel press plate, due to sticking, and this avoid fine control of the uniformity and thickness of the TiO$_2$ layer and sometimes results in considerable defects in TiO$_2$ films.

Thus, in order to form a mechanically stable and electrically efficient nanoporous electrodes and overcome the problem of the method developed by Lindström et al, according to the present invention a volatile organic liquid is applied to fill the pores of the dry metal oxide film, followed by an immediate covering of the wet layer with a thin (1-30 μm) polymeric foil (e.g., 10 μm thick polyethylene foil). This innovation results in a great improvement of the film quality and in a substantial increase of the pressing process rate. The liquid fills the pores of the TiO$_2$ layer, transfers the applied pressure homogeneously in all directions and promotes a creation of a uniformly pressed film. The selected volatile organic liquid should be a low boiling point and low reactivity organic liquid, consisting preferably of carbon and hydrogen, in order to prevent titania film contamination by inorganic impurities. Pentane, hexane, heptane and mixtures thereof were used successfully providing homogeneously pressed metal oxide films without visible defects. In cases that a contamination with haloid atoms is not detrimental for the final device performance, halogenated hydrocarbons such as trichloroethylene and carbon tetrachloride may be used as well, as less or non-flammable organic liquids.

To further improve the efficiency of titania nanoporous photoelectrodes, the present invention provides a new process for coating of fabricated films with a very thin (0.1-3 nm) conformal metal oxide polymeric shell by sol-gel EPD, using a stable low-ionic strength and low conductivity solution of charged inorganic-organic polymers. This process is disclosed in the International Patent Application No. PCT/IL06/00899, entitled "Method for preparation of stable solutions of inorganic-organic polymers", filed on the same date by same applicant, and herewith incorporated by reference in its entirety as if fully described herein. The International Patent Application entered the National Stage as U.S. application Ser. No. 11/997,763, with a 371 (c)(1), (2), (4) date of Aug. 4, 2008, and was published as U.S. Pre-Grant Publication no. 2009/0152115 on Jun. 18, 2009.

The solution for the sol-gel EPD procedure is prepared by polymerization of at least one metal alkoxide by sol-gel technology in the presence of a condensation inhibitor that forms H$^+$ ions, wherein said inhibitor consists in an alcoholic solution containing the additives iodine, acetone and water, which are very suitable for charging of polymeric species in sol and subsequent sol-gel EPD realization.

The metal alkoxide that can be used according to the present invention is an alkoxide of a metal selected from a lanthanide metal such as Ce, Pr, Nd, Pm, Sm, Eu, Gd, Tb, Dy, Ho, Er, Tm, Yb or Lu, a transition metal such as Sc, Ti, V, Cr, Mn, Zr or Zn, an alkaline earth metal such as Be, Mg, Ca, Sr or Ba, Al and a $C_1$-$C_6$, preferably $C_1$-$C_4$, straight or branched alkanol including, without being limited to, methanol, ethanol, propanol, isopropanol, butanol, isobutanol, sec-butanol, tert-butanol, pentanol, neopentanol, sec-pentanol, hexanol and the like.

It is preferable for sol-gel application that the metal alkoxides be in liquid state rather than in solid state as in such case they are better soluble in non-aqueous media and may be easily dissolved in an organic solvent or organic solvents mixture. In preferred embodiments, the metal alkoxide is Ti(OiC$_3$H$_7$)$_4$, Al(OsecC$_4$H$_9$)$_3$, Mg(OC$_2$H$_5$)$_2$ or mixtures thereof.

The concentration of the metal alkoxide is in the range of 0.0001M-0.2M, preferably 0.0005M-0.12M, most preferably 0.001-0.1M, and in case a mixture of alkoxides is used, the overall concentration will be the total value of all alkoxides within this mixture.

The alcoholic solution used in the process of the present invention may be, without being limited to, composed of ethanol, isopropanol, isobutanol or mixtures thereof, and is preferably ethanol.

The concentration of iodine used as a component of the additive in the alcoholic solution is in the range of 0.005-0.25 g/l, preferably 0.06-0.15 g/l, most preferably 0.08-0.12 g/l, and the concentration of acetone is in the range of 0.5-200 ml/l, preferably 5-100 ml/l, most preferably 10-50 ml/l. The amount of deionized water depends on the number of hydrolyzable alkoxide groups in the alkoxide or alkoxide mixture used, as well as on the amount necessary for charging of polymeric species by protons.

It has been further found, that when the quantity of the metal alkoxide increases over a definite limit, some turbidity occurs. This limit depends on the properties, particularly, reactivity and/or solubility of the metal alkoxide in a given alcoholic solution. However, addition of a very small amount of inorganic acid and subsequent stirring leads to a transparent solution. The preferred inorganic acid for this purpose is nitric acid, but when the contamination with chlorine ions is not important, hydrochloric acid may be used as well. The concentration of the inorganic acid is in the range of 0.000001-0.05 mol of acid per mole of alkoxide, preferably 0.000001-0.0001 mol of acid per mole of alkoxide, most preferably 0.000005-0.00005 mol of acid per mole of alkoxide.

The electrodes produced according to the method of the present invention can be used in dye-sensitized solar cells (DSSCs), as well as in other photoelectrochemical applications such as water purification and photocatalysis.

The invention will now be illustrated by the following non-limiting Examples.

EXAMPLES

Example 1

Production of Titania Nanoporous Electrodes by EPD and DSSC Fabricated therefrom 0.65 g of commercially available titania nanopowder P-25 (Degussa AG, Germany) was mixed with 150 ml of ethanol and 0.4 ml of acetylacetone, and stirred with magnetic stirrer for 24 h in a closed vessel (herein "P-25 suspension"). 27 mg of iodine, 4 ml of acetone and 2 ml of deionized water were added to 100 ml of ethanol and stirred with magnetic stirrer or sonicated with cooling of the solution in an ice bath till iodine was dissolved (herein "charging solution"). After that, the P-25 suspension was added to the charging solution and mixed, followed by sonication during 15 min using an Ultrasonic Processor VCX-750 (Sonics and Materials, Inc.) to homogenize the mixture with cooling of the suspension in an ice bath. The obtained suspension was applied for EPD.

The electrophoretic cell contained two electrodes of F-doped-SnO$_2$ conductive glass (8 Ohm/square), one serving as the cathodic substrate and one as a counter-electrode. Deposition area of the photoelectrode was 20 cm$^2$. The two electrodes were placed vertically at a distance of 54 mm and immersed in a suspension of 250 ml. The EPD process was performed at room temperature using constant current mode. A Keithley 2400 Source Meter was applied as a power supply. The current density was 0.4 mA/cm$^2$ and the deposition time was 2 min. A homogeneous adherent TiO$_2$ nanoporous layer with thickness of 17-18 μm was obtained. After drying at 150° C. during 40 min and cooling to room temperature, the fabricated electrode was placed on a plate of hydraulic programmable press. Hexane was uniformly dropped on the surface of the TiO$_2$ film, and the wet layer was immediately covered with polyethylene foil (10 μm). A pressure of 800 kg/cm$^2$ was applied, resulting in a homogeneously pressed TiO$_2$ film without visible defects. The thickness of the pressed titania film was 9-10 μm.

After drying at 150° C. during 4 h the fabricated electrode was sensitized with N3-dye by immersing the still warm (80-100° C.) film in a dye solution (0.5 mM in ethanol). The overnight dipping was done at room temperature. The dye-covered electrode was then rinsed with ethanol and dried under a filtered air stream. A two-electrode sandwich cell with an effective area of 0.635 cm$^2$ was employed to measure the performance of DSSCs using a Pt-coated F-doped-SnO$_2$ glass as a counter-electrode. The composition of the electrolyte was: 0.6 M dimethylpropylimidazolium iodide, 0.1 M LiI, 0.05 M I$_2$, 0.5 M tert-butylpyridine in 1:1 acetonitrile-methoxypropionitrile. Photocurrent-voltage characteristics were performed using an EcoChemie Potentiostat. A 250W xenon arc lamp (Oriel) calibrated to approximately 100 mW/cm$^2$ (AM 1.5 solar emission) served as light source. The conversion efficiencies were not corrected for reflection and absorption losses of the conductive glass, which are estimated to be at least 15% in the visible region of the spectrum (Nazeeruddin et al., 2001).

Measuring the photovoltaic performance of DSSCs consisting of the fabricated nanoporous photoelectrode showed: short-circuit photocurrent (J$_{sc}$) of 10.37 mA/cm$^2$, open-circuit photovoltage (V$_{oc}$) 765 mV, fill factor (FF) 69.5% and light-to-electricity conversion efficiency of 5.5%.

Example 2

Production of Magnesia-Coated Titania Nanoporous Electrodes by EPD and DSSC Fabricated therefrom Preparation of P-25 nanoparticles suspension for EPD, EPD conditions and mechanical pressing conditions were the same as described in Example 1. The thickness of the pressed nanoporous titania photoelectrode was 9-10 μm. For further improving the photovoltaic performance of DSSC fabricated from this electrode, a magnesia polymeric coating was deposited by the sol-gel EPD process.

For the sol-gel EPD process, the following solution was prepared: 20 mg of iodine, 3.5 ml of acetone and 5 μl of nitric acid were added to 250 ml of ethanol. The mixture was stirred with magnetic stirrer for 1 h in a closed vessel. Using an inert atmosphere glove-box, 0.3 g of Mg(OC$_2$H$_5$)$_2$ was placed in a bottle and hermetically sealed. The sealed bottle was transferred outside the glove box where, under ambient conditions, the solution of iodine and acetone in ethanol was added to the precursor in the bottle, followed by vigorous stirring. The solution was sonicated for 30 min using an Ultrasonic Processor VCX-750 (Sonics and Materials, Inc.) with cooling in an ice bath. Then, 1.8 ml of deionized water was added to the solution under vigorous stirring followed by 24 h gentle stirring with magnetic stirrer, resulting in a not quite clear sol, but without a precipitate. The sol was left for aging in a closed vessel without stirring at ambient conditions for 7 days, after which it was purified by centrifugation at 5000-8000 rpm for 3-5 min.

The resulting transparent sol was applied for magnesia polymeric coating of the titania nanoporous electrode referred above. The electrophoretic cell contained two electrodes: the titania nanoporous electrode (conductive glass substrate) served as cathode, and a F-doped-SnO$_2$ conductive glass served as the counter-electrode. The electrodes were placed vertically at a distance of 54 mm in 250 ml of the magnesia coating solution. The EPD process was performed at room temperature using the constant current mode of the power supplier (Keithley 2400 Source Meter). The current density was 25 μA/cm$^2$ and duration of EPD was 1 min. After drying of the coated electrode, first at ambient conditions and then in oven at 150° C. for 4 h, the fabricated electrode was applied as photoelectrode in a DSSC.

The measurement of the photovoltaic performance was carried out as described in Example 1 and the results were as follows: the short-circuit photocurrent (J$_{sc}$) was 11.77 mA/cm$^2$, open-circuit photovoltage (V$_{oc}$) 785 mV, fill factor (FF) 67.9% and light-to-electricity conversion efficiency was 6.27%. As could be seen from these results, compared to the results presented in Example 1, applying of magnesia polymeric coating promotes substantial improvement of the photovoltaic performance of DSSC.

Example 3

Production of Titania Polymeric Coated Titania Nanoporous Electrodes by EPD and DSSC Fabricated therefrom Preparation of P-25 nanoparticles suspension for EPD and EPD conditions were the same as described in Example 1. Mechanical pressing was performed the same way as in Example 1, but the pressure was 1000 kg/cm$^2$. The thickness of the pressed nanoporous titania photoelectrode was 9-10 μm. For further improving the photovoltaic performance of DSSC fabricated from this electrode, a titania polymeric coating was deposited by the sol-gel EPD process.

For the sol-gel EPD process, the following solution was prepared: 10 mg of iodine, 4 ml of acetone and 2 ml of deionized water were added to 250 ml of ethanol. The mixture was stirred with magnetic stirrer for 1 h in a closed vessel. In a glove-box with inert atmosphere, 0.5 ml of Ti(OiC$_3$H$_7$)$_4$ was placed in a bottle with a hermetically sealed cap. The bottle was transferred outside the glove-box, and immediately the solution of iodine, acetone and water in ethanol was added to the bottle containing the above-mentioned precursor, under ambient conditions and vigorous stirring. The solution was stirred during 24 h resulting in a transparent sol (the color of the sol gradually changed from yellow to colorless). The sol was left for aging in a closed vessel without stirring at ambient conditions for 7 days, after which it was ready for EPD. In a closed vessel under ambient conditions, this sol stays transparent and stable during at least several months.

The resulting transparent sol was applied for sol-gel EPD coating of titania nanoporous electrode. The electrophoretic cell contained two electrodes: the titania nanoporous electrode on conductive glass served as the cathode, and a F-doped-$SnO_2$ conductive glass served as a counter-electrode. The electrodes were placed vertically at a distance of 54 mm in a suspension of 250 ml. The EPD process was performed at room temperature using the constant current mode of the power supply (Keithley 2400 Source Meter). The current density was 50 $\mu A/cm^2$ and duration of EPD was 3 min.

After drying of the coated electrode, first at ambient conditions and then in an oven at 150° C. for 4 h, the fabricated electrode was applied as photoelectrode in a DSSC. At 1-sun light illumination, the light-to-electricity conversion efficiency for the titania-coated electrode was 6.3%, while the same but uncoated photoelectrode yielded conversion efficiency of only 5.3%

Example 4

Production of Titania Nanoporous Electrodes with a Titania Polymeric Coating on Conductive Plastic Substrate and DSSC Fabricated therefrom 0.65 g of commercially available titania nanopowder P-25 (Degussa AG, Germany) was mixed with 150 ml of ethanol and 0.4 ml of acetylacetone, and stirred with magnetic stirrer for 24 h in a closed vessel (herein "P-25 suspension"). 27 mg of iodine, 4 ml of acetone and 2 ml of deionized water were added to 100 ml of ethanol and stirred with magnetic stirrer or sonicated with cooling of the solution in an ice bath till iodine was dissolved (herein "charging solution"). After that, the P-25 suspension was added to the charging solution and mixed, followed by sonication during 15 min using an Ultrasonic Processor VCX-750 (Sonics and Materials, Inc.) to homogenize the mixture with cooling of the suspension in an ice bath. The obtained suspension was applied for EPD.

The electrophoretic cell contained two electrodes: conductive plastic indium-tin oxide coated polyester (PET) with resistance 60 Ohm/square (Sheldahl., USA) served as cathode and F-doped-$SnO_2$ conductive glass (8 Ohm/square) was a counter-electrode. Deposition area of the photoelectrode was 9 $cm^2$. The two electrodes were placed vertically at a distance of 54 mm and immersed in a suspension of 250 ml. The EPD process was performed at room temperature using constant current mode. A Keithley 2400 Source Meter was applied as a power supply. The current density was 0.65 $mA/cm^2$ and the deposition time was 2 min. A homogeneous adherent $TiO_2$ nanoporous layer with thickness of 17-18 $\mu m$ was obtained.

After drying at 90° C. during 40 min and cooling to room temperature, the fabricated electrode was placed on a plate of hydraulic programmable press. Hexane was uniformly dropped on the surface of the $TiO_2$ film, and the wet layer was immediately covered with polyethylene foil (20 $\mu m$). A pressure of 2500 $kg/cm^2$ was applied, resulting in a homogeneously pressed $TiO_2$ film without visible defects. The thickness of the pressed titania film was 7-8.5 $\mu m$. For further improving the photovoltaic performance of DSSC fabricated from this electrode, a titania polymeric coating was deposited by the sol-gel EPD process the same way as it is shown in Example 3, only the current density was 100 $\mu A/cm^2$ and duration of the sol-gel EPD was 2 min.

After drying of the coated electrode, first at ambient conditions and then in an oven at 150° C. for 40 min, the fabricated electrode was applied as photoelectrode in a DSSC. Measuring the photovoltaic performance of DSSCs consisting of the fabricated nanoporous photoelectrode at 1-sun light illumination showed: short-circuit photocurrent ($J_{sc}$) of 9.5 $mA/cm^2$, open-circuit photovoltage ($V_{oc}$) 810 mV, fill factor (FF) 65% and light-to-electricity conversion efficiency of 5%.

Example 5

Production of Titania Nanoporous Electrodes by EPD and DSSC Fabricated therefrom 1 g of commercially available titania nanopowder P-90 (Degussa AG, Germany) was mixed with 150 ml of ethanol and 0.6 ml of acetylacetone, and stirred with magnetic stirrer for 24 h in a closed vessel (herein "P-90 suspension"). 42 mg of iodine, 6 ml of acetone and 4 ml of deionized water were added to 100 ml of ethanol and stirred with magnetic stirrer or sonicated with cooling of the solution in an ice bath till iodine was dissolved (herein "charging solution"). After that, the P-90 suspension was added to the charging solution and mixed, followed by sonication during 15 min using an Ultrasonic Processor VCX-750 (Sonics and Materials, Inc.) to homogenize the mixture with cooling of the suspension in an ice bath. The obtained suspension was applied for EPD.

The electrophoretic cell contained two electrodes of F-doped-$SnO_2$ conductive glass (8 Ohm/square), one serving as the cathodic substrate and one as a counter-electrode. Deposition area of the photoelectrode was 20 $cm^2$. The two electrodes were placed vertically at a distance of 54 mm and immersed in a suspension of 250 ml. The EPD process was performed at room temperature using constant current mode. A Keithley 2400 Source Meter was applied as a power supply. The current density was 0.5 $mA/cm^2$ and the deposition time was 3 min, at that after every 30 sec of deposition the cathode was removed from suspension and dried in an oven at a temperature of 70-120° C. for 1-3 min, after that it was cooled till room temperature and placed again in the suspension, and EPD was continued. A homogeneous adherent $TiO_2$ nanoporous layer with thickness of 22-24 $\mu m$ was obtained.

After drying at 150° C. during 40 min and cooling to room temperature, the fabricated electrode was placed on a plate of hydraulic programmable press. Heptane was uniformly dropped on the surface of the $TiO_2$ film, and the wet layer was immediately covered with polyethylene foil (20 $\mu m$). A pressure of 1000 $kg/cm^2$ was applied, resulting in a homogeneously pressed $TiO_2$ film without visible defects. The thickness of the pressed titania film was 14.5-15 $\mu m$. After sintering at 550° C. for 2 h, the fabricated electrode was applied as photoelectrode in a DSSC. Measuring the photovoltaic performance of DSSCs consisting of the fabricated nanoporous photoelectrode at 1-sun light illumination showed: short-circuit photocurrent ($J_{sc}$) of 16.2 $mA/cm^2$, open-circuit photovoltage ($V_{oc}$) 755 mV, fill factor (FF) 65.7% and light-to-electricity conversion efficiency of 8%.

REFERENCES

Boccaccini, A. R. Zhitomirsky, I., Application of electrophoretic deposition techniques in ceramic processing, *Current Opinion in Solid State and Material Science,* 2002, 6, 251-260

Boschloo, G. Lindström, H. Magnusson, E. Holmberg, A. Hagfeldt, A., Optimization of dye-sensitized solar cells prepared by compression method, *J. Photochem. Photobiol. A: Chem.,* 2002, 148, 11-15

Fujimura, K. Yoshikado, S., Preparation of $TiO_2$ thin film for dye sensitized solar cell deposited by electrophoresis method, *Key Eng. Mater.,* 2003, 248, 133

Lindström, H. Holmberg, A. Magnusson, E. Lindquist, S. E. Malmqvist, L. Hagfeldt, A., A new method for manufacturing nanostructured electrodes on plastic substrates, *Nano Letters,* 2001a, 1, 97-100

Lindström, H. Holmberg, A. Magnusson, E. Malmqvist, L. Hagfeldt, A., A new method to make dye-sensitized nanocrystalline solar cells at room temperature, *J. Photochem. Photobiol. A: Chem.,* 2001b, 145, 107-112

Lindström, H. Magnusson, E. Holmberg, A. Södergren, S. Lindquist, S. E. Hagfeldt, A., *Sol. Energy Mater. Sol. Cells,* 2002, 73, 91-101

Matthews, D. Kay, A. Grätzel, M., *Aust. J. Chem.,* 1994, 47, 1869-1877

Miyasaka, T. Kijitori, Y. Murakami, T. N. Kimura, M. Uegusa, S., Efficient nonsintering type dye-sensitized photocells based on electrophoretically deposited $TiO_2$ layers, *Chem. Lett.,* 2002, 1250

Murakami, T. N. Kijitori, Y. Kawashima, N. Miyasaka, T., UV light-assisted chemical vapor deposition of $TiO_2$ for efficiency development at dye-sensitized mesoporous layers on plastic film electrodes, *Chem. Lett.,* 2003, 1076-1077

Nazeeruddin, M. K. Kay, A. Rodicio, I. Humphry-Baker, R. Müller, E. Liska, P. Vlachopoulos, N. Grätzel, M., Conversion of light to electricity by cis-$X_2$ bis(2,2-bipyridyl-4,4-dicarboxylate) ruthenium(II) charge-transfer sensitizers (X=Cl$^-$, Br$^-$, I$^-$, CN$^-$ and SCN$^-$) on nanocrystalline $TiO_2$ electrodes, *J. Am. Chem. Soc.,* 1993, 115, 6382-6390

Nazeeruddin, M. K. Pechy, P. Renouard, T. Zakeeruddin, S. M. Humphry-Baker, R. Comte, P. Liska, P. Cevey, L. Costa, E. Shklover, V. Spiccia, L. Deacon, G. B. Bignozzi, C. A. Grätzel, M., Engineering of efficient panchromatic sensitizers for nanocrystalline $TiO_2$-based solar cells, *J. Am. Chem. Soc.,* 2001, 123, 1613-1624

Oekermann, T. Zhang, D. Yoshida, T. Minoura, H., Electron transport and back reaction in nanocrystalline $TiO_2$ films prepared by hydrothermal crystallization, *J. Phys. Chem. B.,* 2004, 108, 2227-2235

O'Regan, B. Grätzel, M., A low-cost, high efficiency solar cell based upon dye-sensitized colloidal $TiO_2$ films, *Nature,* 1991, 353, 737-740

Sarkar, P. Nicholson, P. S., Electrophoretic deposition (EPD): mechanisms, kinetics, and applications to ceramics, *J. Am. Ceram. Soc.,* 1996, 79, 1897-2002

Tabellion, J. Clasen, R., Electrophoretic deposition from aqueous suspensions for near-shape manufacturing of advanced ceramics and glasses-applications, *J. Mater. Sci.,* 2004, 39, 803-811

Zhang, D. Yoshida, T. Minoura, H., Low temperature fabrication of efficient porous titania photoelectrodes by hydrothermal crystallization at the solid/gas interface, *Adv. Mater.,* 2003, 15, 814-817

Zhitomirsky, I., Cathodic electrodeposition of ceramic and organoceramic materials. Fundamental aspects, *Advances in Colloid and Interface Science,* 2002, 97, 279-317

The invention claimed is:

1. A method for production of a nanoporous electrode for photoelectrochemical applications, comprising:
   (a) deposition of nanosize $TiO_2$ crystals on a conductive substrate; and
   (b) formation of mechanical and electrical contact between the $TiO_2$ crystals to form a mechanically stable and electrically efficient nanoporous electrode,
   wherein the deposition of nanosize $TiO_2$ crystals in step (a) is carried out by electrophoretic deposition (EPD) from a stable suspension of $TiO_2$ crystals obtained by:
   (i) treatment of $TiO_2$ crystals with a non-ionic compound capable of forming a complex with titanium thus modifying the surface properties of the $TiO_2$ nanoparticles, in a polar organic solvent, under conditions that enhance adsorption of said compound on the crystals surface; and
   (ii) addition of the suspension obtained in step (i) to a charging solution consisting of iodine, acetone and deionized water in a polar organic solvent, under mixing, followed by sonication of the suspension.

2. The method according to claim 1, wherein the non-ionic compound capable of forming a complex with titanium is acetylacetone or ethyleneglycol and the polar organic solvent is a $C_1$-$C_6$ alkanol such as methanol, ethanol, propanol, isopropanol, butanol, isobutanol, sec-butanol, tert-butanol, pentanol, neopentanol, sec-pentanol, hexanol or a mixture thereof.

3. The method according to claim 2, wherein the non-ionic compound capable of forming a complex with titanium is acetylacetone and the polar organic solvent is ethanol.

4. The method according to claim 1, wherein the conditions that enhance adsorption of said compound on the crystals surface are stirring, milling and/or ultrasound sonication conditions.

5. The method according to claim 1, wherein the stable suspension of nanosize $TiO_2$ crystals is deposited by electrophoretic deposition on a transparent conductive substrate that is stable in said suspension, said substrate being designed for photoelectrode for use in photoelectrochemical applications.

6. The method according to claim 5, wherein the conductive substrate is F-doped-$SnO_2$ conductive glass or conductive plastic.

7. The method according to claim 1, wherein the electrophoretically deposited $TiO_2$ layer is dried before step (b).

8. The method according to claim 1, wherein step (b) is carried out by at least one of the following processes: (i) mechanical pressing of the electrophoretically deposited nanoporous $TiO_2$ film after drying; (ii) coating the electrophoretically deposited nanoporous $TiO_2$ film with a thin layer of metal oxide polymeric species by sol-gel electrophoretic deposition; and (iii) sintering at 450-600° C. for 5-120 min.

9. The method according to claim 8, wherein, prior to pressing, the electrophoretically deposited nanoporous $TiO_2$ film is filled with a low boiling point and low reactivity organic liquid, followed by immediate covering of the wet layer with a thin polymeric foil.

10. The method according to claim 9, wherein the low boiling point and low reactivity organic liquid is pentane, hexane, heptane or a mixture thereof, and the polymeric foil is 1-30 μm polyethylene foil.

11. The method according to claim 8, wherein the coating of the electrophoretically deposited nanoporous $TiO_2$ film is carried out with a thin conformal metal oxide polymeric shell by sol-gel electrophoretic deposition.

12. The method according to claim 11, wherein the sol-gel electrophoretic deposition is carried out with a stable solution of charged inorganic-organic polymeric species produced from at least one metal alkoxide.

13. The method according to claim 12, wherein said solution of charged inorganic-organic polymeric species is prepared by polymerization of at least one metal alkoxide by sol-gel technology in the presence of a condensation inhibitor that forms $H^+$ ions, wherein said inhibitor consists of an alcoholic solution containing the additives iodine, acetone and water.

14. The method according to claim 13, wherein the metal alkoxide is an alkoxide of a metal selected from a lanthanide metal such as Ce, Pr, Nd, Pm, Sm, Eu, Gd, Tb, Dy, Ho, Er, Tm, Yb or Lu, a transition metal such as Sc, Ti, V, Cr, Mn, Zr or Zn, an alkaline earth metal such as Be, Mg, Ca, Sr or Ba, Al and a $C_1$-$C_6$ straight or branched alkanol.

15. The method according to claim 14, wherein said metal alkoxide is $Ti(OiC_3H_7)_4$, $Al(OseeC_4H_9)_3$, $Mg(OC_2H_5)_2$ or a mixture thereof.

16. The method, according to claim 13, wherein the alcohol in the alcoholic solution is ethanol, isopropanol, isobutanol or a mixture thereof.

17. The method according to claim 16, wherein the alcohol is ethanol.

18. Nanoporous electrodes obtained by the method of claim 1.

19. Dye sensitized solar cells comprising nanoporous electrodes according to claim 18.

20. The method according to claim 14, wherein the metal alkoxide is an alkoxide of a metal and a $C_1$-$C_4$ straight or branched alkanol.

* * * * *